US012383456B2

(12) United States Patent
Cambridge

(10) Patent No.: US 12,383,456 B2
(45) Date of Patent: Aug. 12, 2025

(54) INTERACTIVE SEXUAL STIMULATION SYSTEM

(71) Applicant: THIKA HOLDINGS LLC, St. Pete Beach, FL (US)

(72) Inventor: Vivien Johan Cambridge, Myrtle Beach, SC (US)

(73) Assignee: Thika Holdings LLC, St. Pete Beach, FL (US)

( * ) Notice: Subject to any disclaimer, the term of this patent is extended or adjusted under 35 U.S.C. 154(b) by 228 days.

(21) Appl. No.: 16/839,696

(22) Filed: Apr. 3, 2020

(65) Prior Publication Data

US 2020/0315909 A1 Oct. 8, 2020

Related U.S. Application Data

(60) Provisional application No. 62/828,850, filed on Apr. 3, 2019.

(51) Int. Cl.
*A61H 19/00* (2006.01)

(52) U.S. Cl.
CPC ..... *A61H 19/32* (2013.01); *A61H 2201/1215* (2013.01); *A61H 2201/1666* (2013.01); *A61H 2201/5012* (2013.01); *A61H 2201/5043* (2013.01); *A61H 2201/5071* (2013.01); *A61H 2201/5084* (2013.01); *A61H 2201/5092* (2013.01)

(58) Field of Classification Search
CPC ........ A61H 19/00; A61H 19/30; A61H 19/32; A61H 19/34; A61H 19/40; A61H 19/44
See application file for complete search history.

(56) References Cited

U.S. PATENT DOCUMENTS

| | | | |
|---|---|---|---|
| 3,504,665 | A | 4/1970 | Bakunin |
| 4,790,296 | A | 12/1988 | Segal |
| D320,087 | S | 9/1991 | Sholzberg |
| 5,076,261 | A | 12/1991 | Black |
| 5,460,597 | A | 10/1995 | Hopper |
| 5,501,650 | A | 3/1996 | Gellert |
| D384,156 | S | 9/1997 | Kain |
| 5,725,473 | A | 3/1998 | Taylor |
| 5,933,600 | A | 8/1999 | Shieh |
| 6,049,806 | A | 4/2000 | Crecine |

(Continued)

FOREIGN PATENT DOCUMENTS

WO 2020046738 A1 3/2020

OTHER PUBLICATIONS

Website: virtualsexmachine.com; “Welcome to the Future of Virtual Sex”, copyrights 1997-2000, 1997-2010, accessed Dec. 18, 2023 (35 pages).

(Continued)

*Primary Examiner* — Samuel G Gilbert
(74) *Attorney, Agent, or Firm* — Volpe Koenig

(57) ABSTRACT

A sexual stimulation system is disclosed herein. The system includes a phallic input device including at least one sensor configured to detect movement data associated with both stroking and constrictive physical impulses applied to the phallic input device. An output device includes at least one motor configured to displace at least one elastomeric pad in at least two directions, wherein the at least one elastomeric pad is displaced based on the movement data.

12 Claims, 7 Drawing Sheets

(56) References Cited

U.S. PATENT DOCUMENTS

| | | | | |
|---|---|---|---|---|
| 6,142,929 | A | 11/2000 | Padgett | |
| 6,169,914 | B1 | 1/2001 | Hovland | |
| 6,203,491 | B1 | 3/2001 | Uribe | |
| 6,368,268 | B1 * | 4/2002 | Sandvick | A61H 19/32 600/38 |
| D466,218 | S | 11/2002 | Dalton | |
| 6,533,718 | B1 | 3/2003 | Ritchie | |
| 6,592,516 | B2 | 7/2003 | Lee | |
| 6,658,400 | B2 | 12/2003 | Perell | |
| 6,786,863 | B2 | 9/2004 | Abbasi | |
| 6,793,619 | B1 | 9/2004 | Blumental | |
| 6,868,391 | B1 | 3/2005 | Hultgren | |
| 7,010,530 | B2 | 3/2006 | Bartkowiak | |
| 7,056,281 | B2 | 6/2006 | Bookwalter | |
| 7,104,950 | B2 | 9/2006 | Levy | |
| 7,267,646 | B2 | 9/2007 | Tucker | |
| 7,438,681 | B2 | 10/2008 | Kobashikawa | |
| 7,608,037 | B2 | 10/2009 | Levy | |
| 7,762,945 | B2 | 7/2010 | Blumenthal | |
| 7,778,112 | B2 | 8/2010 | Behm | |
| 8,255,299 | B2 | 8/2012 | Cambridge | |
| 8,308,631 | B2 | 11/2012 | Kobashikawa | |
| 8,360,956 | B2 * | 1/2013 | Squicciarini | A61N 1/36007 600/38 |
| 8,378,794 | B2 | 2/2013 | Alarcon | |
| 8,608,644 | B1 | 12/2013 | Davig | |
| 9,173,806 | B1 | 11/2015 | DeMatio | |
| 9,400,555 | B2 | 7/2016 | Quigley et al. | |
| 9,498,404 | B2 | 11/2016 | Murison | |
| 9,762,515 | B1 | 9/2017 | Olivares | |
| 10,123,935 | B2 | 11/2018 | Cambridge | |
| 10,123,936 | B2 | 11/2018 | Cambridge | |
| 10,143,618 | B2 | 12/2018 | Cambridge | |
| 10,945,914 | B1 | 3/2021 | Liu | |
| 11,033,454 | B2 | 6/2021 | Cambridge | |
| 2002/0059102 | A1 | 5/2002 | Sung | |
| 2002/0103415 | A1 | 8/2002 | Manska | |
| 2002/0107965 | A1 | 8/2002 | Piccionelli | |
| 2003/0036678 | A1 * | 2/2003 | Abbassi | A61H 19/40 340/407.1 |
| 2003/0073881 | A1 | 4/2003 | Levy | |
| 2003/0144924 | A1 | 7/2003 | McGee | |
| 2004/0082831 | A1 * | 4/2004 | Kobashikawa | A61H 19/32 600/38 |
| 2006/0047181 | A1 * | 3/2006 | Hsu | A61H 15/0085 600/38 |
| 2009/0099413 | A1 | 4/2009 | Kobashikawa | |
| 2009/0171144 | A1 | 7/2009 | Squicciarini | |
| 2010/0045595 | A1 | 2/2010 | Bakke | |
| 2013/0116502 | A1 | 5/2013 | Cambridge | |
| 2013/0331745 | A1 | 12/2013 | Sedic | |
| 2014/0088468 | A1 | 3/2014 | Murison | |
| 2014/0163437 | A1 | 6/2014 | Mack | |
| 2015/0057493 | A1 | 2/2015 | Harris, Jr. | |
| 2015/0196454 | A1 * | 7/2015 | Levy | A61H 19/32 600/38 |
| 2015/0313638 | A1 | 11/2015 | Rosenberg | |
| 2015/0366748 | A1 | 12/2015 | Cambridge | |
| 2016/0000642 | A1 | 1/2016 | Zipper | |
| 2016/0045392 | A1 | 2/2016 | Massey | |
| 2016/0199249 | A1 | 7/2016 | Dunham | |
| 2016/0279020 | A1 | 9/2016 | Timmermans | |
| 2018/0125748 | A1 | 5/2018 | Goldenberg | |
| 2019/0358119 | A1 | 11/2019 | Cambridge | |
| 2020/0000675 | A1 | 1/2020 | Golan | |

OTHER PUBLICATIONS

Online Publication: CNET; "Virtual Sex Machine inventor seeks adult video stars" published Aug. 6, 2007 (4 pages).

"Fleshlight Announces Release of Vstroker" (website) (https://avn.com/business/articles/novelty/fleshlight-announces-release-of-vstroker-485023.html) (dated Aug. 9, 2012).

"KIIROO and Fleshlight are teaming up to make the best, even better." (website) (http://www.pressat.co.uk/releases/kiiroo-and-fleshlight-are-teaming-up-to-make-the-best-even-better-1d75d5b100b971600c53155cf07ecfce/) (dated Nov. 13, 2014).

"Teledildonics: The Weird, Wonderful World of Social Sex Toys" (website) (https://gizmodo.com/teledildonics-the-weird-wonderful-world-of-social-sex-1516075707) (dated Feb. 7, 2014).

"Lovense—About Us" (website) (https://web.archive.org/web/20140326013804/https://www.lovense.com/sextoys/aboutus) (Archived from Mar. 26, 2014).

"Kiiroo: Sex Toy Visionaries?—EROcentric" (website) (https://erocentric.com/2014/12/23/kiiroo/) (dated Dec. 23, 2014).

Parisi, "RealTouching From A Distance—A diagram from the RealTouch patent", Logic(s) issue 2, "Sex" (2017), retrieved from the internet: https://logicmag.io/sex/realtouching-from-a-distance/.

"Real Touch Interactive" (Internet Archive—Wayback Machine date Jan, 3, 2015), retrieved from the internet: https://web.archive.org/web/20150103231255/https:/www.realtouch.com/.

KIIROO, "How to Connect Your Interactive Toy with the FeelConnect App.", 10 pages, downloaded Jan. 2019.

KIIROO, "How to Connect Your Interactive Toy to Your Favorite Camsite", 32 pages, downloaded Mar. 2019.

KIIROO with Fleshlight, "Kiiroo Onyx User Manual", 17 pages, downloaded Feb. 2018.

"Fleshlight Launch, Powered by: KIIROO" Manual, 13 pages, downloaded Apr. 2017.

Asta, "Overcoming the Distance: KIIROO Review: Is it Really Worth the Money? Find out here." Apr. 18, 2017, 17 pages.

"KIIROO: Pearl Manual", 15 pages, downloaded Mar. 2019.

KIIROO with Fleshlight, "KIIROO Pearl 2 User Manual", 15 pages, downloaded Mar. 2019.

Response dated Nov. 23, 2016, filed in Response to Office Action dated Aug. 25, 2016, in U.S. Appl. No. 14/295,471, 7 pages.

"KIIROO Onyx 2 review: A quieter, more powerful teledildonic device for men?" Nov. 12, 2017 accessible at: https://sextechguide.com/reviews/devices/kiiroo-onyx-2-review-price-rating-deals/.

* cited by examiner

INTERACTIVE SEXUAL STIMULATION SYSTEM

CROSS REFERENCE TO RELATED APPLICATION

This application claims the benefit of U.S. Provisional Application No. 62/828,850, filed Apr. 3, 2019, which is incorporated by reference as if fully set forth.

BACKGROUND

Interactive haptics enhanced entertainment allow service providers, such as web cam performers, to engage customers over the internet through the use of interactive toys and systems.

Interactive toys in the adult entertainment industry are generally configured to allow users who are remote from each other to provide stimulation to one another. To provide this type of system, input signals from a first user must be converted into data signals and sent to the second user's device, which is configured to interpret the data signals. One such configuration is disclosed in PCT Application PCT/US2019/047870, which is incorporated by reference as if fully set forth herein.

It would be desirable to provide a sexual stimulation and interactive system that provides a further degree or aspect of physical interactivity and sensation.

SUMMARY OF THE INVENTION

A system for manual stimulation over a network is disclosed herein. The system allows a first user to manipulate a sex toy (such as a dildo or other phallic object) and transmits data related to the manipulation to a second user such that a sex toy being used by the second user experiences physical sensations associated with the manipulation. In particular, the manipulation includes stroking, constricting, and gripping sensations and impulses.

BRIEF DESCRIPTION OF THE DRAWINGS

The foregoing Summary and the following Detailed Description will be better understood when read in conjunction with the appended drawings, which illustrate a preferred embodiment of the invention. In the drawings.

DETAILED DESCRIPTION OF THE PREFERRED EMBODIMENTS

Figure 1:
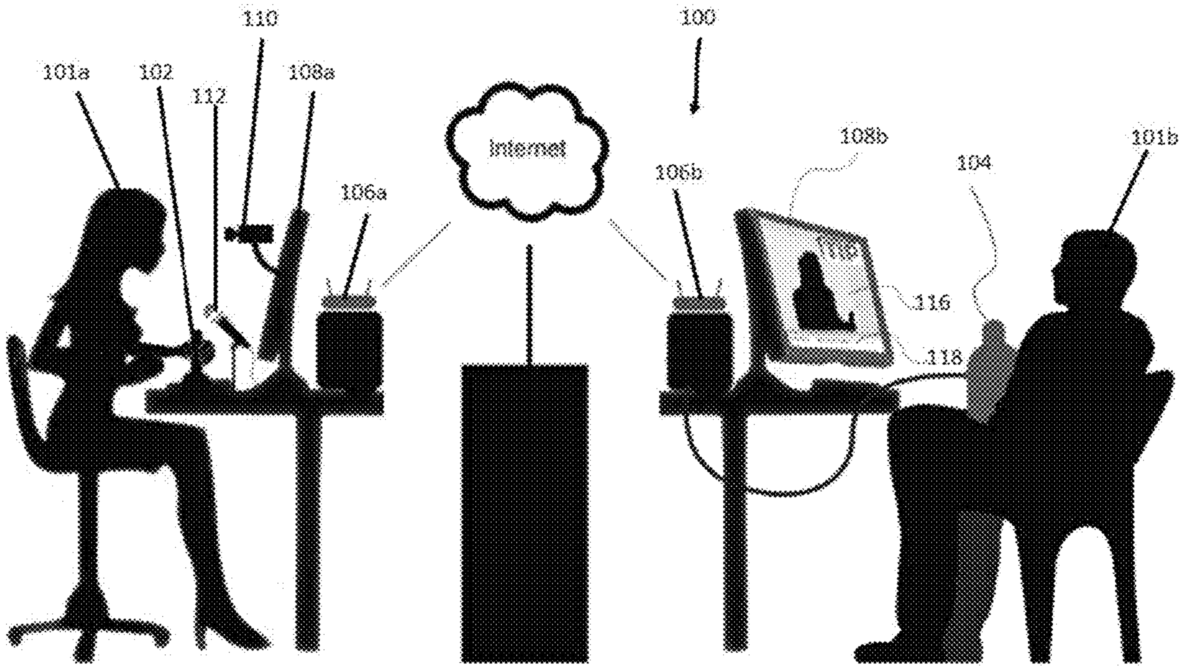
FIG. 1 illustrates a system according to one embodiment of the invention.

As shown in FIG. 1, a system 100 is disclosed in which a first user 101*a* interacts with a second remote user 101*b*. In one embodiment, the first user 101*a* is a webcam performer or model, and the second user 101*b* is a customer or viewer. The second user's display 108*b* can display video (either live or recorded) in a scene 116. Such a display can be a computing device, for example, a computer, a computer monitor, a laptop, a tablet, notebook computer, and mobile phone, a mobile wireless device with a screen, etc. A control panel 118 can be provided to control various aspects of interaction with the first user 101*a*.

A network connection, such as the internet, is established between transmitter/receiver units 106*a*, 106*b*. The connection provides a communication network between the first user 101*a* and the second user 101*b*. In one embodiment, a camera or webcam 110 and/or an audio recorder or microphone 112 is provided at the second user's location. These can be part of a computing device. The camera 110 can provide a livestream of video of the first user 101*a* to the second user 101*b*. The camera 110, which may comprise a computing device, and any associated computing device, are also configured to record video, such that the recorded video can be synchronized or choreographed to the first user's physical interactions with a sex toy.

The first user 101*a* engages a first sex toy or input device 102 (also identified as a phallic input device 6 herein). The first user 101*a* can manually engage the first sex toy 102, such as by hand, or engage the first sex toy 102 with the first user's body or any part thereof. Generally, physical sensations imparted onto the first sex toy 102 are recorded by, or otherwise transmitted to, the system 100, and signals or data regarding the physical sensations are transmitted to the second user 101*b*, and more specifically to the second user's sex toy or output device 104 (also identified as an output device 77 herein). The output device 104 generally comprises a housing that is dimensioned to receive a body part, in particular, a user's penis or member. For example, a stroking sensation can be created by the first user 101*a* by moving their hand longitudinally along the first sex toy 102 while gripping it. A gripping or constricting sensation can be created by the first user 101*a* by squeezing the first sex toy 102. The first sex toy 102 preferably has a one or more sensors configured to detect these movements, such as pressure, piezoelectric, optical, mechanical or other sensors. The movements and any other physical manipulation create haptic data to be transmitted according to the system.

The second user 101*b* engages the output device 104, which is configured to receive haptics data generated by physical manipulation and engagement of the input device 102. Haptic data can further relate to any movement or imparted sensation to be transmitted by the system. In particular, as the first user 101*a* strokes and constricts or grips the phallic input device 102 these physical impulses and sensations are felt by the second user 101*b* through the output device 104.

Figure 2:
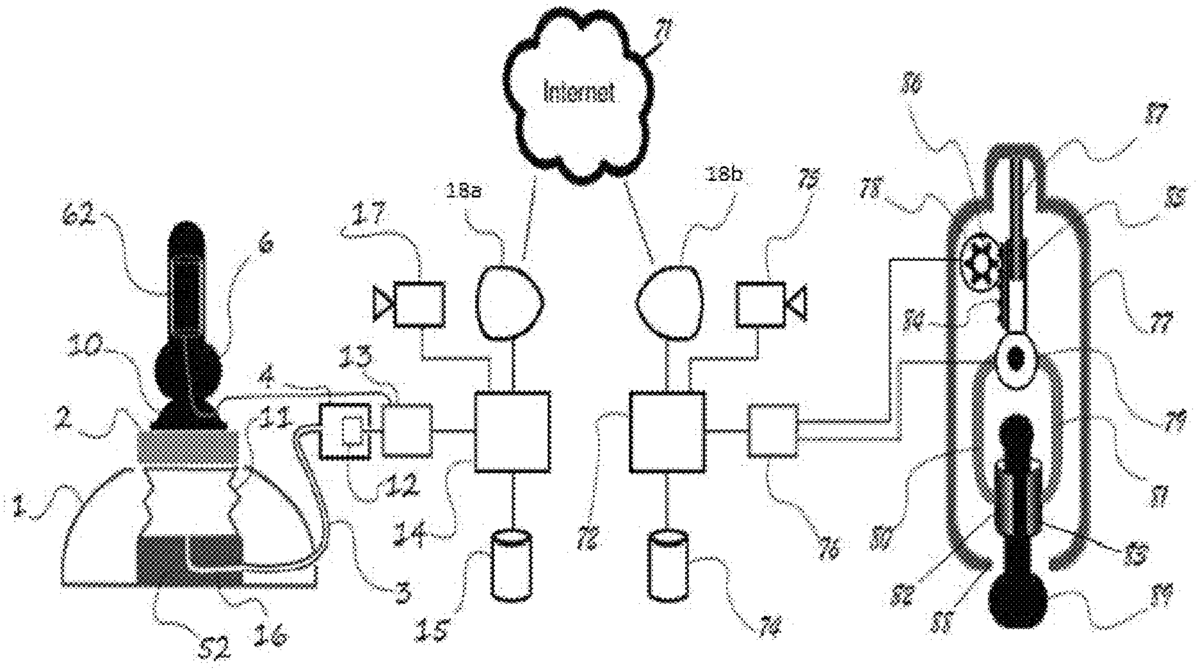
FIG. 2 illustrates further details of the system of FIG. 1.

Further details of the system 100 are illustrated in FIG. 2. A phallic input device 6 is provided that includes a base 2 connected to a housing 1. Generally, data related to stroking, gripping, or constriction of the input device 6 is captured by the system 100. This data can then be embedded into video data transmitted to the second user 101*b*.

As shown in FIG. 2, in one embodiment, the phallic input device 6 includes bellows 11 which expand and contract with stroking action applied to the phallic input device 6. Pressure fluctuations are created inside of the bellows 11, and a pressure detector 12 arranged inside of a chamber 4 in communication via a conduit 3 with the bellows 11 is configured to detect these fluctuations. A conduit passage 16 is also defined in a core 52 of the housing 1. The pressure sensor 12 is configured to transmit pressure dependent data to a processor 13. The bellows 12 may include an air blower, such as a fan and/or motor combination, capable of increasing the air pressure. A vent may also be provided for either manually or automatically venting air from the bellows.

Figure 5:
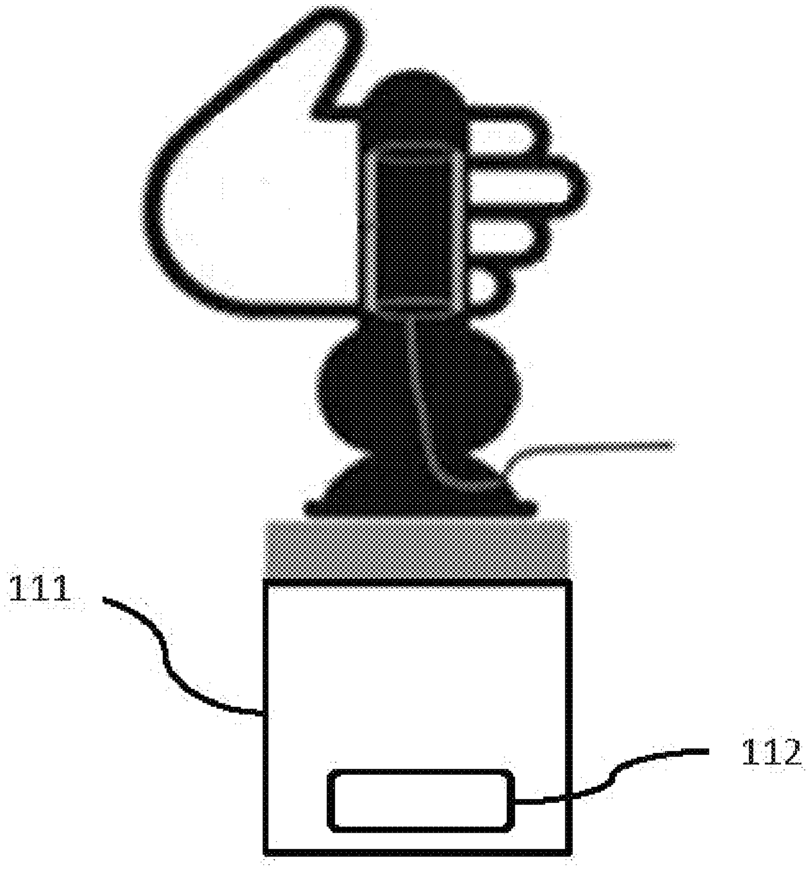
FIG. 5 illustrates an alternative embodiment of a phallic input device including a pressure or force sensor.

As shown in FIG. 5, another pressure sensor arrangement can be provided that does not require the bellows 11. In FIG. 5, a housing 111 is attached to the phallic input device 6. The housing 111 includes a sensor 112 that is either integrated with the housing 111 or separately attached to the housing 111. In one embodiment, the sensor 112 is a pressure sensor or piezo-resistive force sensor. In one embodiment, the sensor 112 is a strain gage.

Although the pressure detector 12 is illustrated in FIG. 2, one of ordinary skill in the art would also understand that the stroking motion can be detected by other means, such as by a sleeve 62, described in more detail herein.

The sleeve 62 extends for a majority of a length of a shaft of the input device 6. As used herein, the term majority means at least 50%, and preferably more than 75%. The sleeve 62 can be provided inside the input device 6 or is provided on an external surface of the input device 6.

In one embodiment, the sleeve 62 is comprised of a pressure-sensitive conductive sheet material which is configured to detect constrictive force applied to the shaft of the input device 6. In one embodiment, the sleeve 62 is configured to also detect stroking motion applied to the input device 6. The sleeve 62 is also generically referred to as a detector or sensor.

In one embodiment, force applied to the shaft of the input device 6 causes a reduction in resistance to current flow through the conductive sheets in the sleeve 62. This current flow is directly related to constrictive force applied to the shaft of the phallic device 6 and transmitted to the processor 13. Therefore, this arrangement provides a direct, proportional, and dynamic system for converting the intensity of a user's grip to the output device 77. Thus, the present invention can transmit a signal relating to the degree or intensity of a grip or stroke, and a user of an output device can feel the haptic sensation of variable degrees of intensity or pressure of a stroke, grip or constriction. Thus, the present invention much more closely models and resembles real variable human interaction.

Stroke and constructive force related data acquired by the processor 13 is then processed and transmitted to a central processor 14. As shown in FIG. 2, video data of the first user 101*a* of the phallic device 6 is acquired via a video camera 17. The processor 14 is configured to synchronize data regarding the physical sensations imparted onto the phallic device 6 with video data recorded by the video camera 17.

Stroke and constrictive force dependent data is embedded in video data acquired from video camera 17 and transmitted through the network 71 to another processor 72 located proximal to the second user. Haptics data is extracted in the processor 72 and transmitted to a secondary processor 76, which uses haptics data to control at least one motor 78, 79. Although multiple processors are shown in FIG. 2, one of ordinary skill in the art would understand based on this disclosure that the number of processors can be decreased or increased, depending on the computing requirements.

As shown in FIG. 2, the at least one motor 78, 79 is configured to drive actuator arms 80, 81. As shown in FIG. 2, the actuator arms 80, 81 are each connected to one of a pair of elastomeric pads 82, 83. In one embodiment, the elastomeric pads 82, 83 are formed from silicone. One of ordinary skill in the art would understand that the pads 82, 83 can be formed from any rubber or soft material, including foam, gel, or other material. Further, the pads 82, 83 can be formed as sleeves or rings.

The elastomeric pads 82, 83 have a longitudinal or axial extent that is at least equal to a longitudinal or axial extent of the sleeve 62. Accordingly, the sensations imparted by the elastomeric pads 82, 83 onto the second user's member 89 are similar to the exact sensations imparted by the first user onto the phallic input device 6. Constrictive, gripping, and stroking action are imparted by the elastomeric pads 82, 83 onto the user's member 89. Additional types of motion or physical stimuli can be imparted by the elastomeric pads 82, 83, such as vibrational movement, heating sensations, lubrication, etc.

As shown in FIG. 2, displays 18*a*, 18*b* are provided at each of the user's locations so that the users can interact with each other via recorded or live video. The cameras 17, 75 can provide the ability to transmit live or recorded video and audio between the users. Memory units and/or CPU units 15, 74 can also be provided at each user's location.

The output device 77 includes an outer housing defining an opening 88 dimensioned to receive the user's member 89. Inside of the output device 77, motors 78 and 79 generally control the actuator arms 80, 81 which are connected to the elastomeric pads 82, 83.

In one embodiment, the motor 79 is attached to a hollow tube 85 that surrounds a guide rod 87. The motor 78 can include a gear 86 configured to rotate and drive sprocket 84 longitudinally inside of the output device 77. This configuration provides a rack and pinion type configuration to provide articulation of the elastomeric pads 82, 83 relative to the user's member 89. This arrangement provides stroking motion via the pads 82, 83.

One of ordinary skill in the art would understand that the contours of the elastomeric pads 82, 83 can be varied. For example, the elastomeric pads 82, 83 can be customizable such that the pads are representative of the first user's genitals. In one embodiment, more than two elastomeric pads 82, 83 are provided. The elastomeric pads 82, 83 preferably extend circumferentially for at least 180 degrees, and more preferably extend for at least 300 degrees. In one embodiment, the pads 82, 83 collectively extend circumferentially for 360 degrees such that sensation is provided to an entire circumference of the user's member 89.

In one embodiment, the motor 78 controls stroking motion (i.e. longitudinal displacement of the pads 82, 83). In one embodiment, the motor 79 drives the pads 82, 83 laterally and controls constrictive motion (i.e. compressive or radial movement of the pads 82, 83). One of ordinary skill in the art would understand that alternative motor arrangements can be provided.

In one embodiment, the processor 76 provides dual input commands to both motors 78, 79. One of ordinary skill in the art would understand that in alternative embodiments, a separate processor can be dedicated to each motor 78, 79.

Figure 3A:
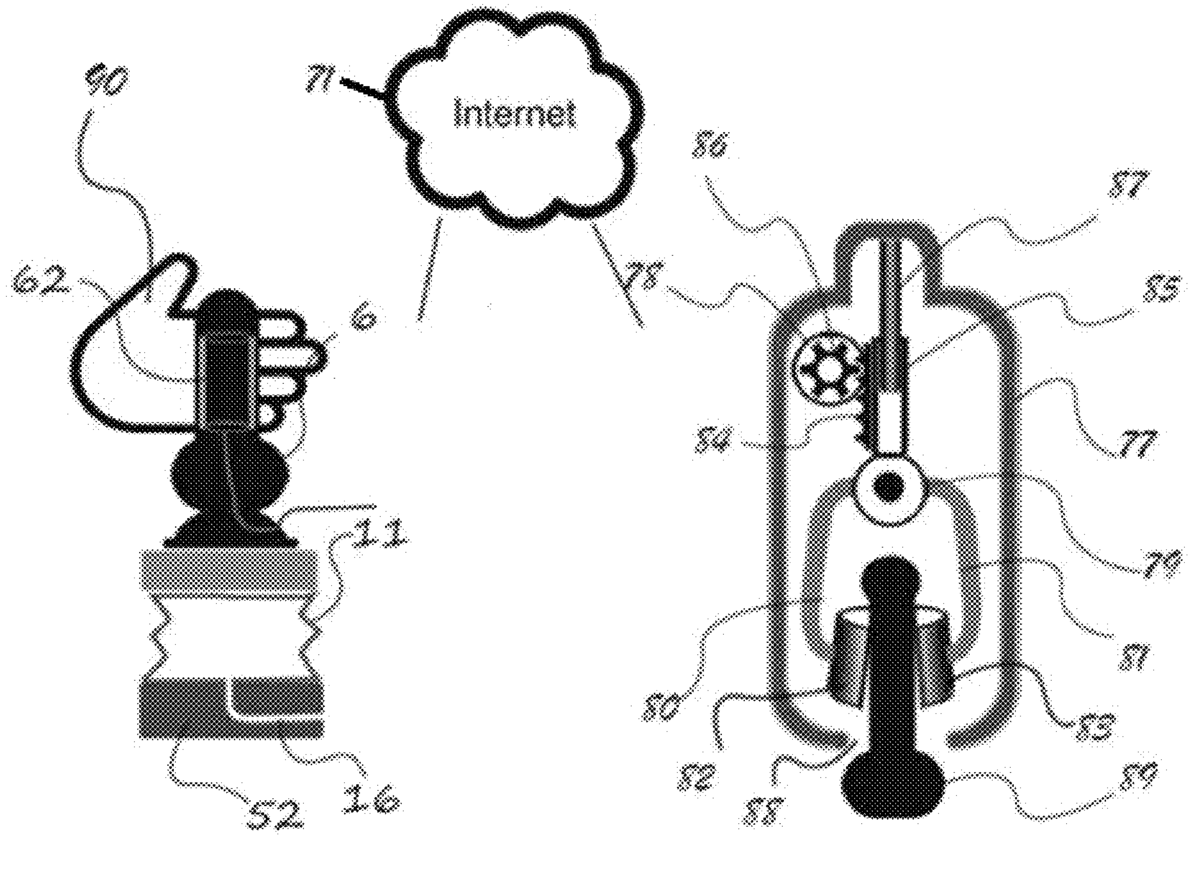
FIGS. 3A-3C illustrate various states of use of the system of FIGS. 1 and 2.
Figure 3B:
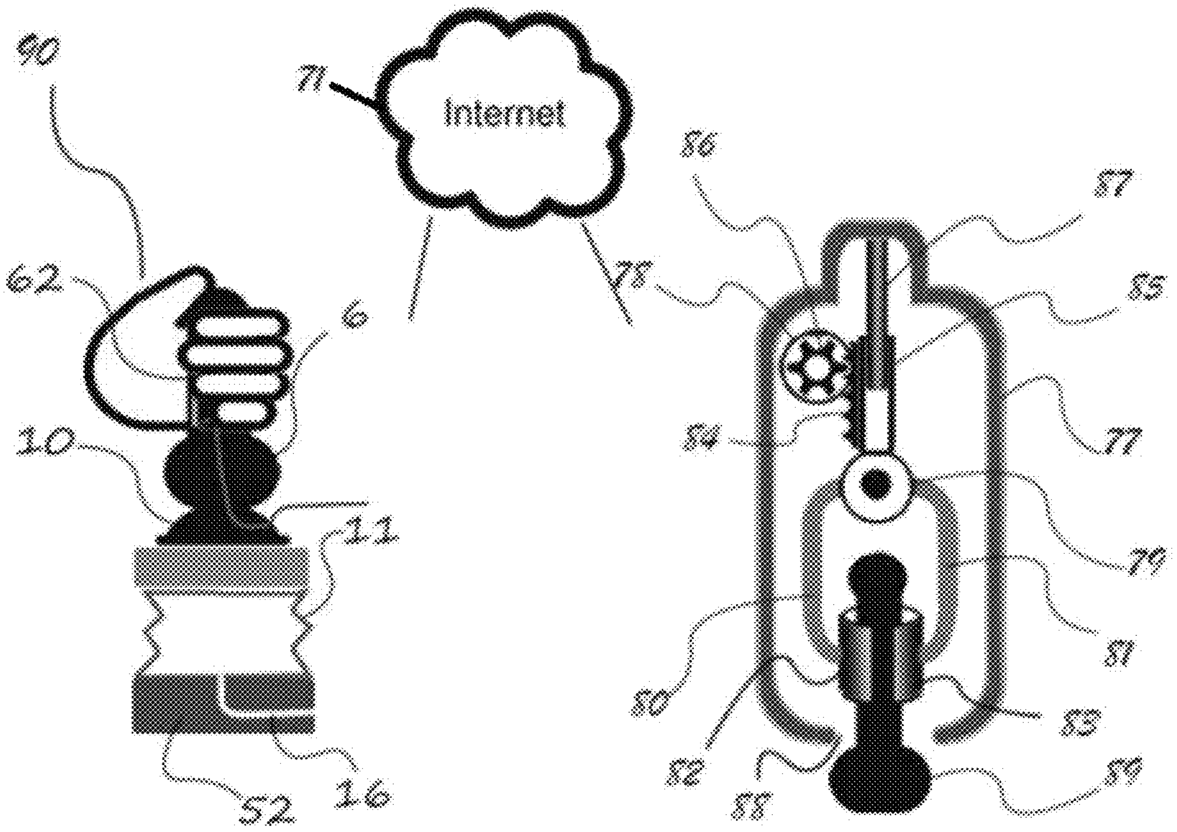
Figure 3C:
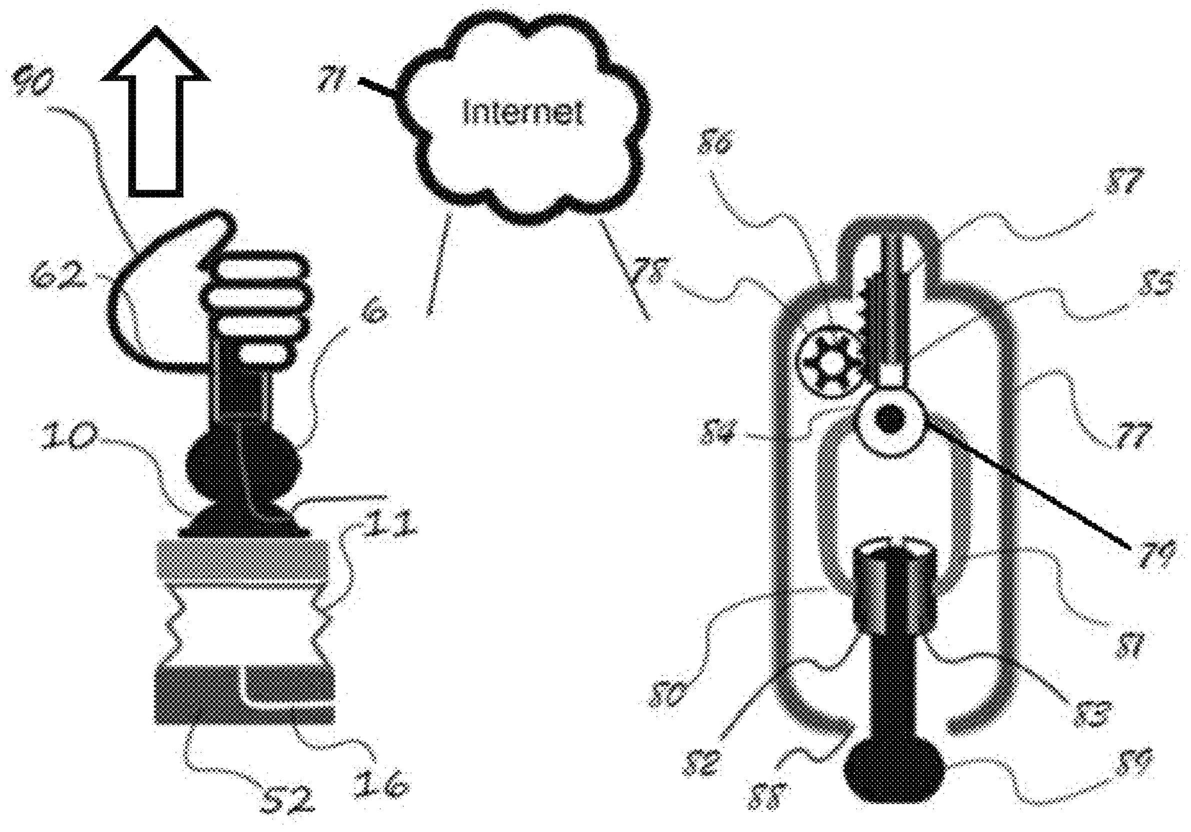

FIGS. 3A-3C illustrate varying states of interaction between two users of the system. As shown in FIG. 3A, the first user's hand 90 is in a non-gripped state relative to the input device 6. Accordingly, the elastomeric pads 82, 83 are in a non-compressed position relative to the second user's member 89.

In FIG. 3B, the second user's hand 90 is in a gripped position relative to the input device 6. As a result, the elastomeric pads 82, 83 are driven into a compressed position relative to the second user's member 89. The intensity of the first user's grip is detected and recorded by the sleeve 62, such that the corresponding intensity of the elastomeric pads 82, 83 engaging the second user's member 89 is directly related to the first user's grip. The system provides a dynamic and proportional system in which the first user's physical manipulation of the input device 6 is immediately and directly transmitted to the output device 77.

FIG. 3C is similar to FIG. 3B in that FIG. 3C also illustrates the first user as gripping the input device 6, such that the elastomeric pads 82, 83 are still in a compressed state. FIG. 3C further illustrates that as the first user's hand 90 is moved longitudinally upwards, the elastomeric pads 82, 83 similarly are moved longitudinally upwards. In FIG. 3C, the motor 78 drives the gear 86 in a counterclockwise direction such that the hollow tube 85 is driven upwards, along with the motor 79, the arms 80, 81 and the pads 82, 83.

Generally, the arrangement and system disclosed herein allows one user engaging a phallic input device to conveniently, quickly, and dynamically create data (such as video and physical/haptic) that is directly related to stroking and constricting action. This data is then used to drive another sex toy being engaged by another user. The sex toy experiences stroking, constricting pressure, and other sensations directly related to the first user engaging the phallic input device.

In one embodiment, a single first user engages the system, and multiple second users are provided with constrictive and stroking motion from the single first user. For example, one webcam performer can grip and stroke the phallic input device such that a plurality of customers experience the gripping and stroking sensations of the webcam performer.

Figure 4:
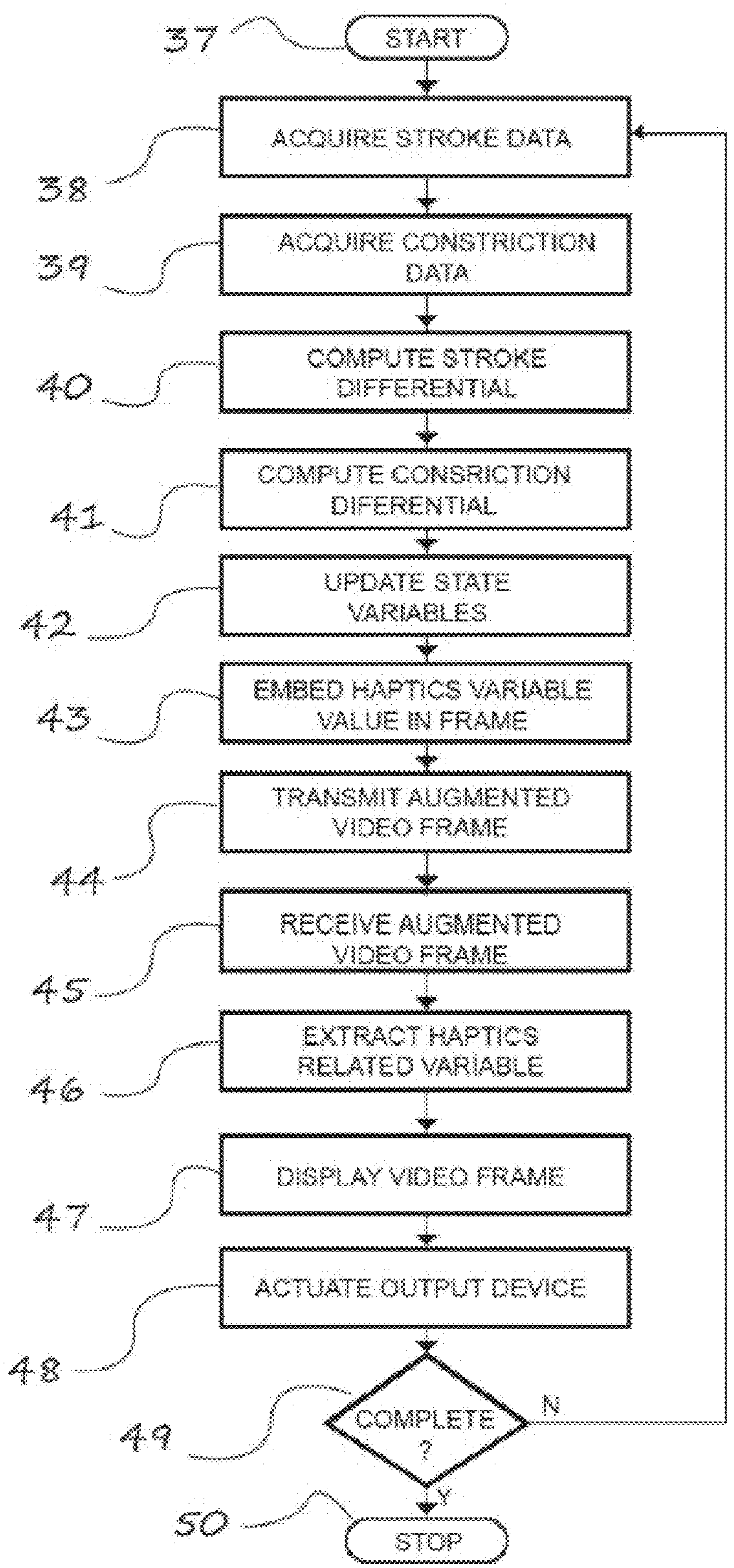
FIG. 4 illustrates a flow chart according to one embodiment of a method of using the system of FIGS. 1, 2, and 3A-3C.

FIG. 4 illustrates a flow chart of a process or method of the system disclosed herein. As shown in FIG. 4, the process starts at step 37 and acquires stroke data from the pressure sensor at step 38. Next, step 39 includes acquiring constriction data from the sleeve. At step 40, the method computes differential stroke data. Step 41 includes computing a constriction differential. Steps 40 and 41 are performed simultaneously.

Based on steps 40 and 41, the method then updates state variables at step 42. Step 43 includes embedding haptics variable values into a frame of a video. Next, this data is transmitted to a remote location in step 44. Step 45 then includes receiving this data and step 46 includes extracting haptics information from the data. Step 47 displays video information from the data, and step 48 includes actuating the output device. Steps 47 and 48 are performed simultaneously.

The process repeats in a continuous loop to provide a dynamic feedback system for the users. If the process is complete at step 49 (i.e. a session is terminated), then the system stops at step 50. If the process or session is not terminated at step 49, then the system repeats as a loop back to step 38 or any one of the intervening steps.

Having thus described the present embodiments in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

The invention claimed is:

1. A sexual stimulation system comprising:
   a phallic input device including at least one sensor configured to detect movement data associated with both stroking and constrictive physical impulses applied to the phallic input device; and
   an output device including at least one motor configured to displace at least one elastomeric pad in at least two directions, wherein the at least one elastomeric pad is displaced based on the movement data.

2. The system of claim 1, wherein the at least one sensor is formed as a sleeve having a first longitudinal extent, and the at least one elastomeric pad has a second longitudinal extent, wherein the second longitudinal extent is at least equal to the first longitudinal extent.

3. The system of claim 2, wherein the sleeve is integrated inside of the phallic input device.

4. The system of claim 1, wherein the sensor is comprised of a pressure-sensitive conductive sheet material.

5. The system of claim 1, wherein the output device includes an outer housing defining an opening dimensioned to receive a user's penis.

6. The system of claim 1, further comprising a camera configured to record a user of the phallic input device, wherein video data recorded by the camera is synchronized with the movement data.

7. The system of claim 1, wherein the at least one motor includes a first motor and a second motor, wherein the first motor is configured to drive the at least one elastomeric pad in a longitudinal direction, and the second motor is configured to drive the at least one elastomeric pad in a lateral direction.

8. The system of claim 7, further comprising a rack and pinion gear arrangement, wherein the first motor is rotationally driven to drive the at least one elastomeric pad in the lateral direction.

9. The system of claim 7, further comprising at least one actuator arm having a first end connected to the second motor and a second end connected to the at least one elastomeric pad.

10. The system of claim 1, wherein the at least one elastomeric pad is formed from silicone.

11. The system of claim 1, further comprising a pressure detector connected to the phallic input device, wherein the pressure detector is configured to detect longitudinal displacement of the phallic input device.

12. The system of claim 1, wherein the phallic input device and the output device are in communication with each other via a network.

* * * * *